United States Patent

Hasegawa

[11] Patent Number: 5,242,309
[45] Date of Patent: Sep. 7, 1993

[54] ROTARY CONNECTOR

[75] Inventor: Masahiro Hasegawa, Tokyo, Japan

[73] Assignee: The Furukawa Electric Co., Ltd., Tokyo, Japan

[21] Appl. No.: 768,819

[22] Filed: Sep. 30, 1991

[30]  Foreign Application Priority Data

Oct. 5, 1990 [JP] Japan .................. 2-105136[U]

[51] Int. Cl.⁵ ........................................... H01R 35/02
[52] U.S. Cl. ..................................... 439/15; 439/164
[58] Field of Search ................... 200/61.27–61.35, 200/61.54–61.57; 439/15, 164

[56]  References Cited

U.S. PATENT DOCUMENTS

| | | | |
|---|---|---|---|
| 4,744,763 | 5/1988 | Suzuki et al. | 439/15 |
| 4,768,394 | 9/1988 | Mizuno et al. | 200/61.54 X |
| 4,888,456 | 12/1989 | Suzuki | 200/61.27 |
| 4,913,662 | 4/1990 | Noy | 174/268 X |
| 4,936,782 | 6/1990 | Bannai et al. | 439/15 |
| 4,978,191 | 12/1990 | Hasegawa et al. | 439/15 X |
| 5,151,042 | 9/1992 | Okada | 439/15 X |

FOREIGN PATENT DOCUMENTS 0243047 10/1987 European Pat. Off. .

Primary Examiner—J. R. Scott
Attorney, Agent, or Firm—Frishauf, Holtz, Goodman & Woodward

[57]  ABSTRACT

A rotary connector for connecting a steering device operable through a steering wheel to a vehicle body side, which includes a rotatable case mounted to the steering device and provided with a cancel cam for restoring a combination switch, a fixed case combined with the rotatable case, and a flat cable spirally wound and housed in the fixed and rotatable cases, the flat cable having inner and outer ends extended to outside through outlet portions formed in corresponding ones of the rotatable and fixed cases, wherein loosening and tightening of the flat cable permit a predetermined number of rotations of the rotatable case relative to the fixed case. In this rotary connector, the outlet portion for extending the inner end of the flat cable therethrough to the outside comprises at least two outlet portions for a left-hand steering wheel and a right-hand steering wheel located in different positions of the rotatable case.

8 Claims, 4 Drawing Sheets

ROTARY CONNECTOR

BACKGROUND OF THE INVENTION

1. Field of the Invention

The present invention relates to a rotary connector which is mounted to a steering device for connecting the rotating steering device to a vehicle body side.

2. Description of the Related Art

Steering devices involve a rotating motion caused by a steering wheel, and thus, a rotary connector is used to connect the steering device to the vehicle body side.

The rotary connector comprises, for example, a fixed case and a rotatable case, produced by molding a synthetic resin, and a spirally wound flexible flat cable arranged in an annular space defined by the fixed and rotatable cases and including a plurality of electrical conductors covered with an insulating material for transmitting an electrical signal.

A plurality of lead wires are connected to the conductors at each end of the flat cable, and the connected portions are molded into one piece using a synthetic resin. The molded part at the outer end of the cable is fitted into an outlet portion of the fixed case and the molded part at the inner end is fitted into an outlet portion of the rotatable case, such that the lead wires at both ends of the cable are extended to the outside of the cases.

The rotary connector is mounted to the steering device, as mentioned above, and thus, in some cases, provided is with cancel cams integral therewith for restoring a combination switch arranged close thereto, such as a turn signal switch, to a previous position.

The cancel cams are two in number and are formed at the lower portion of the rotatable case symmetrically about the axis of rotation and in different positions depending on whether the vehicle has a left-hand or right-hand steering wheel. Conventionally, therefore, rotatable cases for right-hand steering and rotatable cases for left-hand steering are manufactured separately, to provide two types of rotary connectors with cancel cams.

To produce two types of rotary connectors, however, two types of molds having different shapes are required for resin forming. Accordingly, the manufacturing cost is increased correspondingly, and the management of parts become complicated because two different types of rotary connectors must be taken care of.

SUMMARY OF THE INVENTION

An object of the present invention is to provide a rotary connector which can be used not only for a vehicle with a right-hand steering wheel but also for a vehicle with a left-hand steering wheel.

To achieve the above object, there is provided a rotary connector for connecting a steering device operated through a steering wheel to a vehicle body side, including a rotatable case mounted to the steering device and provided with a least one cancel cam for restoring a combination switch, a fixed case combined with the rotatable case, and a flat cable spirally wound and housed in the fixed and rotatable cases, the flat cable having inner and outer ends extended to outside through outlet portions formed in corresponding ones of the rotatable and fixed cases, wherein the flat cable is allowed to loosen and tighten to thereby permit a predetermined number of rotations of the rotatable case relative to the fixed case. The present invention is characterized in that the outlet portion for extending the inner end of the flat cable therethrough to outside comprises at least two outlet portions for a left-hand steering wheel and a right-hand steering wheel located in different positions of the rotatable case.

According to the rotary connector of the present invention, the rotatable case has at least two cable outlet portions at different positions, for passing the inner end of the flat cable therethrough. Accordingly, a single connector can be used not only for a vehicle with a right-hand steering wheel but also for a vehicle with a left-hand steering wheel, by using different outlet portions for passing the inner end of the cable, whereby the manufacturing cost of rotary connectors is reduced and the parts management is simplified.

Preferably, the rotary connector further comprises a detection protuberance provided on an upper portion of the rotatable case, and a protective cover having a plurality of insertion holes for insertion of the detection protuberance therethrough and capped on the rotatable case, wherein the detection protuberance is inserted selectively through a predetermined one of the insertion holes of the protective cover during assembling, depending on whether the inner end of the flat cable is extended to outside through the outlet portion for a left-hand steering wheel or right-hand steering wheel.

According to the preferred embodiment, it is easy to ascertain from outside through which outlet portion of the rotatable case the inner end of the flat cable is inserted, i.e., whether the assembled rotary connector is for a right-hand or left-hand steering wheel, by simply checking into which insertion hole the detection protuberance is inserted.

The above and other objects, features, and advantages of the present invention will become apparent from the ensuing detailed description taken in conjunction with the accompanying drawings.

DETAILED DESCRIPTION OF THE PREFERRED EMBODIMENT

A preferred embodiment of the present invention will be described in detail with reference to FIGS. 1 through 8.

Figure 1:
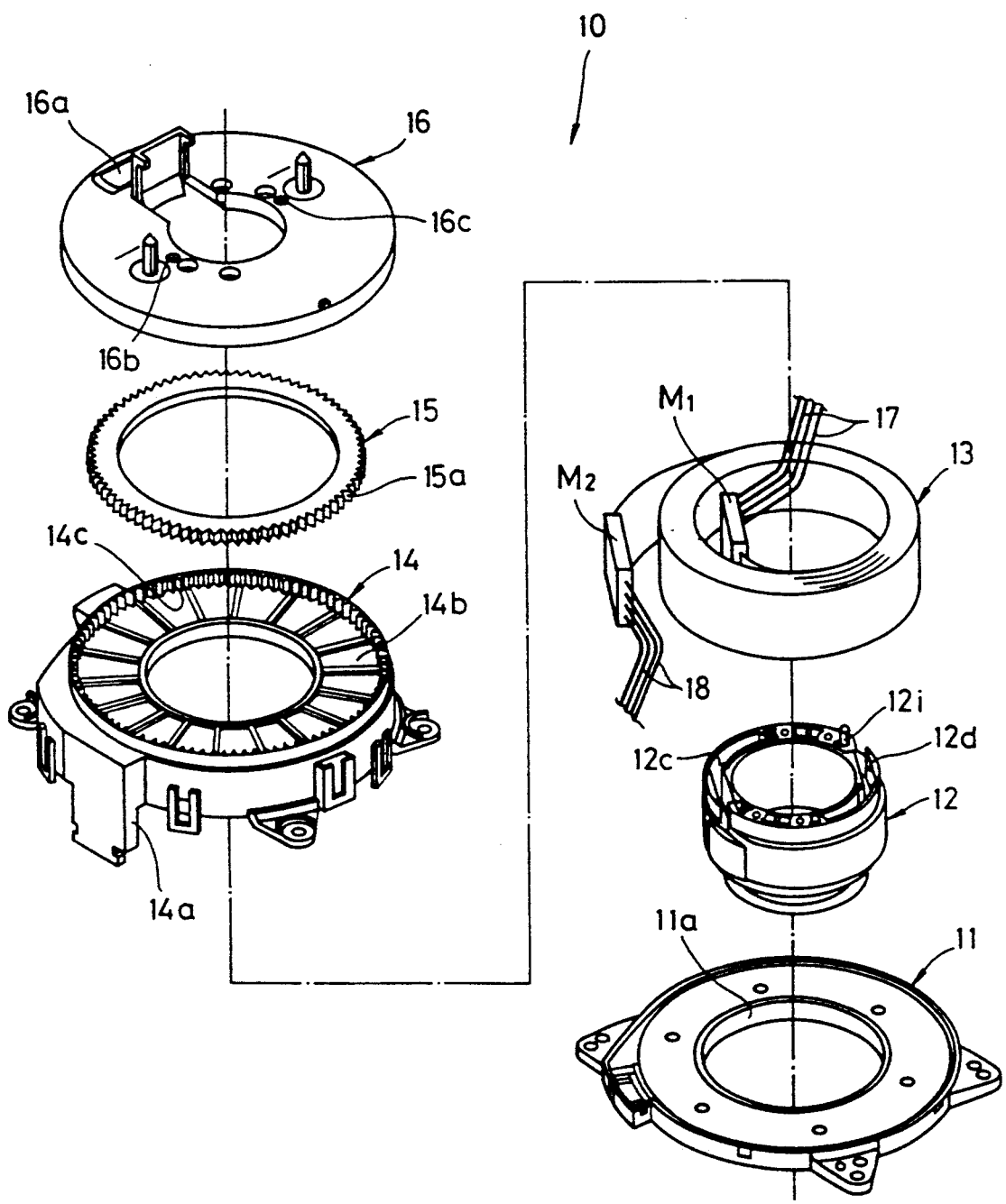
FIG. 1 is a perspective view of a rotary connector according to one embodiment of the present invention, showing how the connector is assembled.
Figure 2:
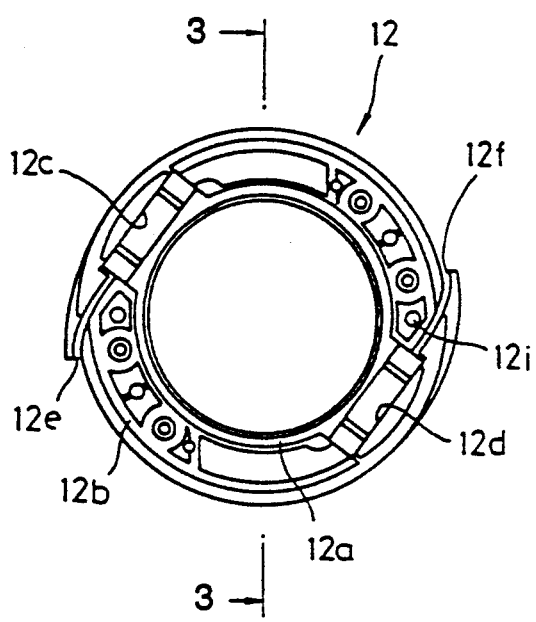
FIG. 2 is a plan view of an inner cylindrical case.
Figure 3:
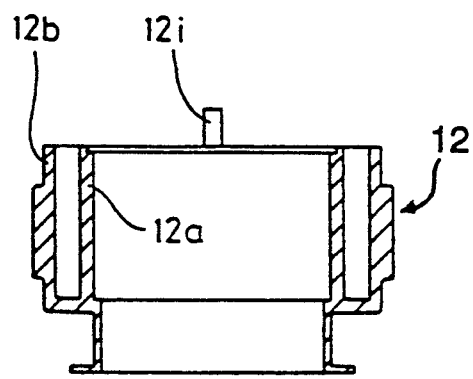
FIG. 3 is a sectional view taken along line 3—3 in FIG. 2.

As shown in FIG. 1, a rotary connector 10 comprises a base plate 11, an inner cylindrical case 12, a flat cable 13, an outer cylindrical case 14, an indicator gear 15, and a protective cover 16, which are successively put together in the mentioned order. The base plate 11 and the outer cylindrical case 14 constitute a fixed case while the inner cylindrical case 12 serves as a rotatable case, and these elements are produced by molding a synthetic resin.

The base plate 11 is a disc-shaped member which is to be secured to a vehicle body, and has an engaging opening 11a in the center thereof for engaging with a lower portion of the inner cylindrical case 12.

The inner cylindrical case 12 is a cylindrical member through which a steering shaft is inserted vertically (as viewed in FIG. 1). As seen from FIGS. 2 to 4, cable outlet portions 12c and 12d are each formed between inner and outer walls 12a and 12b and located in diametrically opposite positions of the case 12.

The outlet portions 12c and 12d are in communication with the outside through slits 12e and 12f cut in the outer wall 12b, respectively. A molded part $M_1$ at the inner end of a flat cable 13, mentioned later, is detachably fitted into one of the outlet portions, depending on whether the vehicle has a left-hand or right-hand steering wheel.

Figure 4:
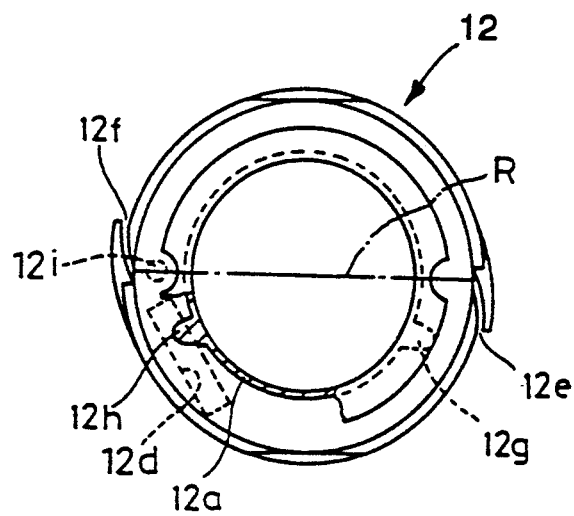
FIG. 4 is a partly broken bottom view of the inner cylindrical case.

As shown in FIG. 4, radially outwardly extending cancel cams 12g and 12h project integrally from the lower end of the inner wall 12a of the inner cylindrical case 12. The cams 12g and 12h operate when the steering wheel is turned, in such a way that a turn signal switch of a steering device (neither is shown) is returned to a previous position taken before the steering wheel is turned. The cams 12g and 12h are located on the same side as the outlet portion 12d with respect to a diametrical line R passing through a detection boss 12i. The detection boss 12i is a protuberance which enables a determination to be made as to whether the rotary connector 10 is for a right-hand or left-hand steering wheel when it is assembled, and is located in the vicinity of the outlet portion 12d.

Figure 5:
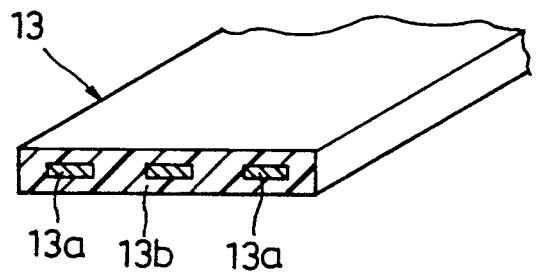
FIG. 5 is a perspective view showing an end of a flat cable.

As shown in FIG. 5, the flat cable 13 includes a plurality of electrical conductors 13a covered with an insulating material 13b, and is loosely wound in spiral form in an annular space defined by the inner and outer cylindrical cases 12 and 14. Lead wires 17 are connected to the electrical conductors 13a at the inner end of the flat cable 13, and the connected portions are molded into one piece using a synthetic resin, as shown in FIG. 1, thereby forming a molded part $M_1$ for the protection from tensile stress. Lead wires 18 are connected to the outer end of the flat cable 13, and the connected portions are similarly molded to form a molded part $M_2$ for the purpose of protection.

The flat cable 13 loosens or tightens as the inner cylindrical case 12 is rotated in accordance with the steering operation, and the rotary connector 10 permits a predetermined number of rotations of the inner cylindrical case 12 relative to the fixed case constituted by the base plate 11 and the outer cylindrical case 14.

The outer cylindrical case 14 is a member engaged by the base plate 11 and surrounding the inner cylindrical case 12. An outlet portion 14a is formed on the outer periphery of the case 14 for guiding the load wires 18 connected to the outer end of the flat cable 13 to outside, and a grooved recess 14b is formed in the upper surface of the case 14 for rotatably receiving the indicator gear 15. Teeth 14c are cut in the inner peripheral surface of the outer wall of the case 14.

The indicator gear 15 serves to indicate the number of clockwise or counterclockwise rotations of the inner cylindrical case 12. As shown in FIG. 1, the indicator gear 15 has teeth 15a on the outer peripheral surface thereof for engaging with the internal teeth 14c of the outer cylindrical case 14, and the numbers of clockwise and counterclockwise rotations are indicated on the upper surface of the gear 15. The number of the teeth of the indicator gear 15 is smaller than that of the internal teeth 14c so that the numbers of rotations can be shown. The indicator gear 15 is prevented from slipping off from the recess 14b by the protective cover 16 capped on the upper portion of the inner cylindrical case 12.

The protective cover 16 has an eccentric cam (not shown) provided at a lower surface thereof for positioning the indicator gear 15 eccentrically, and a transparent indicator window 16a through which the upper surface of the indicator gear 15 can be seen. The protective cover 16 further includes insertion holes 16b and 16c into which the detection boss 12i of the inner cylindrical case 12 is inserted.

The detection boss 12i is inserted into one of the insertion holes 16b and 16c, and this permits a determination to be made as to whether the rotary connector 10 is assembled for a right-hand or left-hand steering wheel. Specifically, the molded part $M_1$ at the inner end of the flat cable 13 is fitted into one of the outlet portions 12c and 12d of the inner cylindrical case 12, depending on whether the connector is for a right-hand or left-hand steering wheel, and thus, the detection boss 12i is inserted into the insertion hole 16b or 16c of the protective cover 16 in accordance with the steering type, left-hand steering or right-hand steering.

According to the rotary connector 10 of the present invention, the inner cylindrical case 12 has two outlet portions 12c and 12d for receiving the molded part $M_1$ at the inner end of the flat cable 13, as described above.

Accordingly, the rotary connector 10 can be assembled for use with a right-hand or left-hand steering wheel as needed, by fitting the molded part $M_1$ into the outlet portion 12c or 12d.

For example, if the rotary connector 10 is to be assembled for a right-hand steering wheel, the molded part $M_1$ is fitted into the outlet portion 12d. In this case, the detection boss 12i is inserted into the insertion hole 16b when the rotary connector 10 is assembled.

If, on the other hand, the rotary connector 10 is to be assembled for a left-hand steering wheel, the molded part $M_1$ is fitted into the outlet portion 12c, in which case the detection boss 12i is inserted into the insertion hole 16c when the rotary connector 10 is assembled.

Accordingly, a rotary connector that was assembled for a right-hand steering wheel can be easily modified for use with a left-hand steering wheel, by pulling out the detection boss 12i from the outlet portion 12d and fitting it into the outlet portion 12c.

Figure 6:
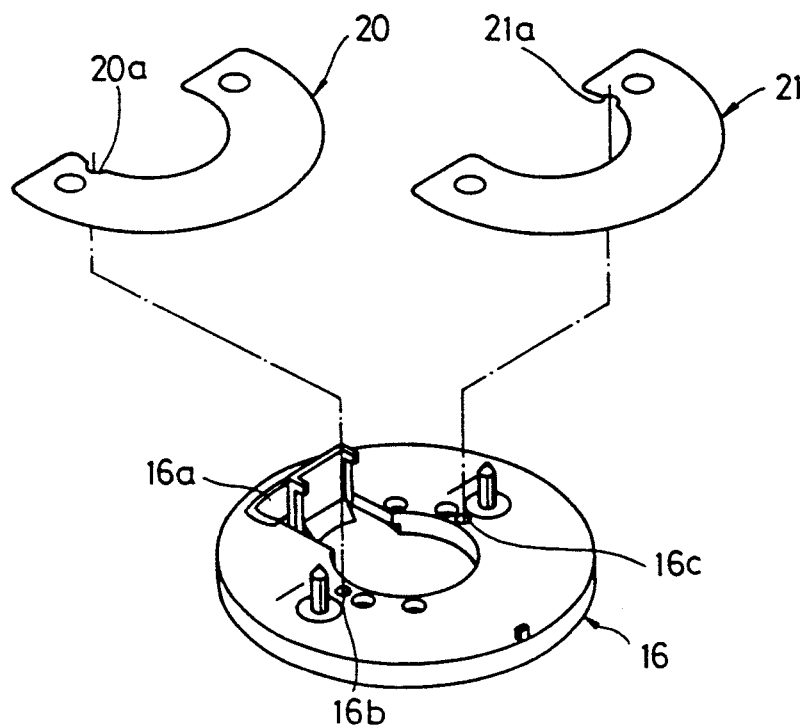
FIG. 6 is a perspective view showing how a confirmation label is used.
Figure 7:
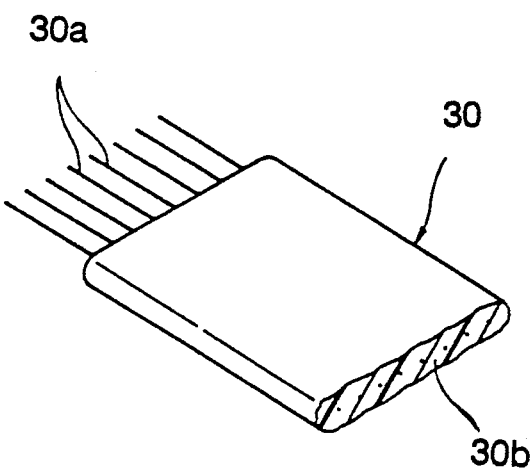
FIG. 7 is a perspective view showing another example of the flat cable.
Figure 8:
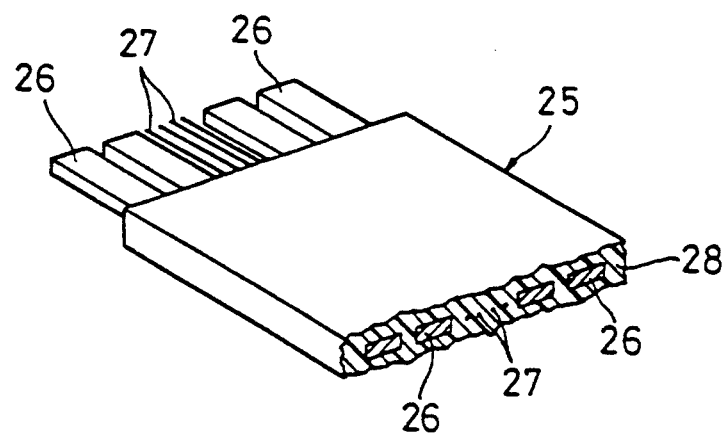
FIG. 8 is a perspective view showing still another example of the flat cable.

In this connection, a confirmation label 20 for a right-hand steering wheel or a confirmation label 21 for a left-hand steering wheel, having a cut 20a or 21a corresponding in position to the insertion hole 16b or 16c, may be applied to the upper surface of the protective cover 16, as shown in FIG. 6.

This permits a quick determination to be made as to whether the assembled rotary connector is for use with a right-hand or left-hand steering wheel, whereby the assembling of the rotary connector itself and the mounting of same to the steering device are facilitated and an erroneous operation during mounting can be eliminated.

The embodiment has been explained with reference to a flat cable including electrical conductors covered with an insulating material, but the present invention is not limited to this. For example, a cable to be used may be a flat cable 20 shown in FIG. 7, in which a plurality of optical fibers 20a are embedded in a covering 20b of synthetic resin, or a flat cable 25 shown in FIG. 8, in which a plurality of electrical conductors 26 and a plurality of optical fibers 27 are covered with an insulating material 28.

What is claimed is:

1. A rotary connector for use in connecting a steering device operable through a steering wheel to a vehicle body, the rotary connector comprising:
    a rotatable case adapted to be mounted to a steering device of a vehicle;
    a fixed case coupled with the rotatable case and defining a space therein, the rotatable case being rotatable relative to the fixed case;
    a flat cable spirally wound and housed in the space defined in the fixed and rotatable cases, the flat cable having inner and outer ends extended to outside of the rotatable and fixed cases through respective outlet portions formed in corresponding ones of the rotatable and fixed cases, the flat cable being loosenable and tightenable in the space defined in the cases upon rotation of the rotatable case relative to the fixed case to thereby permit at least a predetermined number of rotations of the rotatable case relative to the fixed case;
    at least two outlet portions respectively located at different positions of the rotatable case for selectively serving as the outlet portion through which the inner end of the flat cable extends to the outside of the cases, one of said outlet portions being a left-hand steering outlet portion and the other of said outlet portions being a right-hand steering outlet portion;
    a detection protuberance provided on an upper portion of the rotatable case; and
    a protective cover having a plurality of insertion holes for receiving the detection protuberance therethrough and capped on the rotatable case, the detection protuberance being insertable selectively through a predetermined one of the insertion holes of the protective cover, depending on whether the inner end of the flat cable is extended to the outside of the cases through the left-hand steering outlet portion or the right-hand steering outlet portion.

2. A rotary connector according to claim 1, wherein the protective cover has a confirmation element applied to a portion of an upper surface thereof corresponding to the insertion hole.

3. A rotary connector according to claim 2, further comprising indicator means including an indicator gear coupled to at least one of the cases for indicating a number of rotations of the rotatable case.

4. A rotary connector according to claim 1, further comprising indicator means including an indicator gear coupled to at least one of the cases for indicating a number of rotations of the rotatable case.

5. A rotary connector according to claim 1, wherein the flat cable comprises an electrical transmission line including a plurality of electrical conductors covered with an insulating material for transmitting an electrical signal through the electrical conductors.

6. A rotary connector according to claim 1, wherein the flat cable comprises an optical transmission line including a plurality of optical fibers for transmitting an optical signal.

7. A rotary connector according to claim 1, wherein the flat cable comprises a composite transmission line, the composite transmission line including:
    a plurality of electrical conductors for transmitting an electrical signal therethrough; and
    a plurality of optical fibers for transmitting an optical signal therethrough; and
    an insulating material wholly covering said electrical conductors and said optical fibers of said composite transmission line.

8. A rotary connector for use in connecting a steering device operable through a steering wheel to a vehicle body, the rotary connector comprising:
    a rotatable case adapted to be mounted to a steering device of a vehicle;
    a fixed case coupled with the rotatable case and defining a space therein, the rotatable case being rotatable relative to the fixed case;
    a flat cable spirally wound and housed in the space defined in the fixed and rotatable cases, the flat cable having inner and outer ends extended to outside of the rotatable and fixed cases through respective outlet portions formed in corresponding ones of the rotatable and fixed cases, the flat cable being loosenable and tightenable in the space defined in the cases upon rotation of the rotatable case relative to the fixed case to thereby permit at least a predetermined number of rotations of the rotatable case relative to the fixed case;
    at least two outlet portions respectively located at different positions of the rotatable case for selectively serving as the outlet portion through which the inner end of the flat cable extends to the outside of the cases, one of said outlet portions being a left-hand steering outlet portion and the other of said outlet portions being a right-hand steering outlet portion; and
    indicator means including an indicator gear coupled to at least one of the cases for indicating a number of rotations of the rotatable case.

* * * * *